Patented Feb. 4, 1941

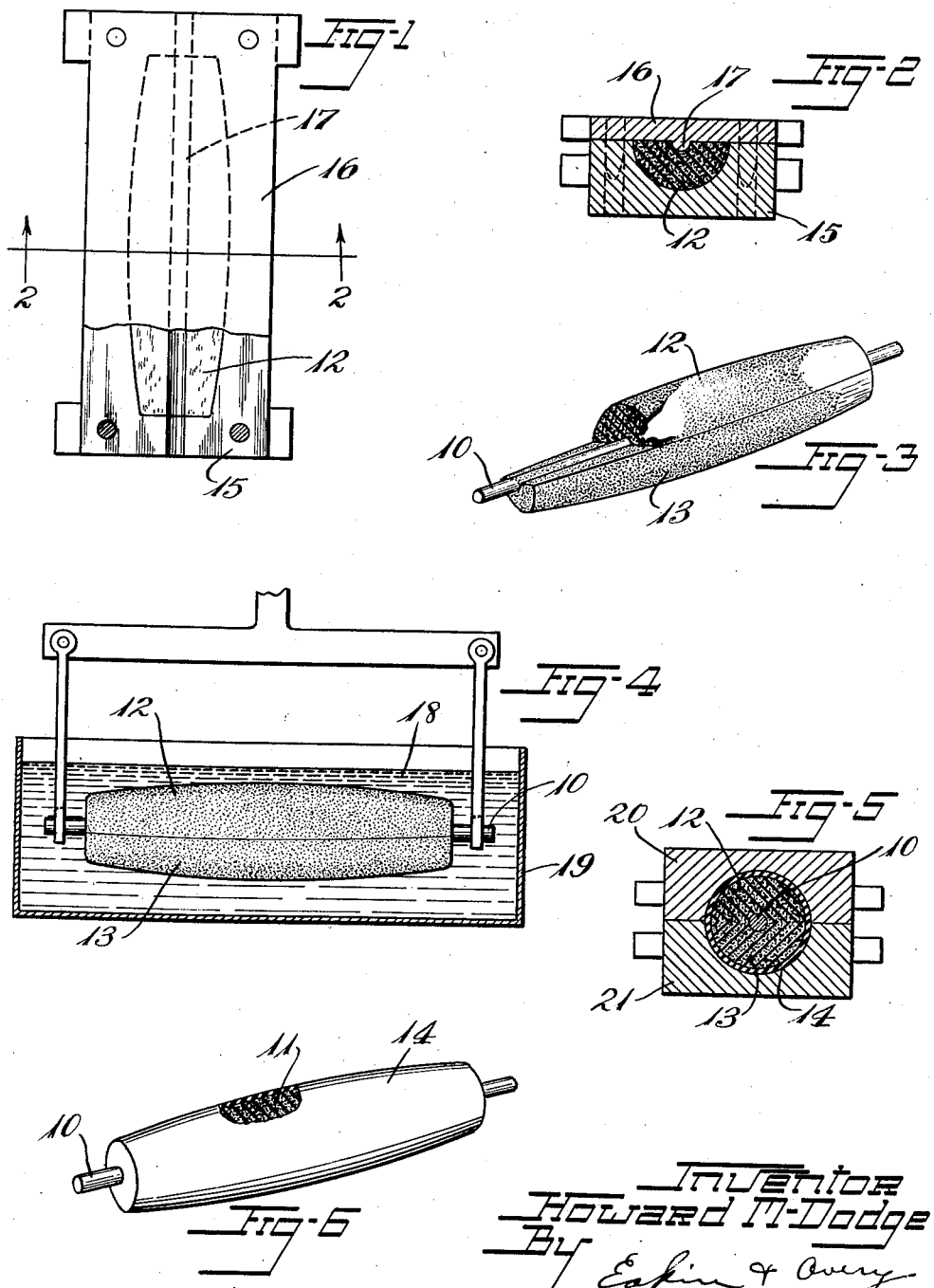
Feb. 4, 1941. H. M. DODGE 2,230,289
RUBBER COVERED ROLL AND METHOD OF MAKING THE SAME
Filed Feb. 26, 1936

2,230,289

UNITED STATES PATENT OFFICE

2,230,289

RUBBER COVERED ROLL AND METHOD OF MAKING THE SAME

Howard M. Dodge, Akron, Ohio, assignor to The B. F. Goodrich Company, New York, N. Y., a corporation of New York Application February 26, 1936, Serial No. 65,838

4 Claims. (Cl. 18—59)

This invention relates to the manufacture of rubber covered rolls.

The principal objects of the invention are to provide a roll having an impervious pliable surface and a soft resilient body, and to provide simplicity, efficiency and economy of operation in the manufacture thereof.

Other objects will appear from the following description and the accompanying drawing.

Of the drawing:

Fig. 1 is a plan view of a mold for forming a half of the sponge rubber cushion, part of the upper plate being broken away to show the mold cavity and the article therein.

Fig. 2 is a cross-sectional view of the same taken on line 2—2 of Fig. 1.

Fig. 3 is a perspective view showing the rigid mandrel, and the halves of the sponge rubber cushion assembled thereon, part of one of the halves being broken away and part shown in section.

Fig. 4 is an elevation of a dipping tank in section, showing the roll and its support as used in applying a rubber coating to the roll.

Fig. 5 is a cross-sectional view of the second mold with the finished roll therein.

Fig. 6 is a perspective view of a finished roll in its preferred form, part of the impervious covering being broken away to show the sponge rubber cushion.

Referring to the drawing, the numeral 10 designates a rigid shaft about which a body of sponge rubber 11 is assembled from sections 12, 13. A protective resilient cover 14 encloses the sponge rubber cushion and is vulcanized thereto.

To form the sponge rubber sections 12, 13, a mold comprising a lower plate 15 and an upper plate 16 is provided, having a cavity of the desired size and shape of the finished section. The top plate is formed with a rib 17 to form a semi-cylindrical groove for engaging the shaft 10.

A suitable quantity of vulcanized sponge rubber composition, usually about one third in volume as compared to the cavity, is introduced between the mold plates and the mold is subjected to heat and pressure to vulcanize and expand the sponge rubber composition.

When a sufficient number of cushion sections have been molded, they are coated with rubber cement and assembled about the shaft 10. A coating of cement is then applied to the surface of the roll.

A layer of rubber 14 is then applied over the surface of the sponge rubber. This is preferably accomplished by applying a coat of coagulant material and then dipping the roll in a natural or artificial dispersion of rubber 18 contained in a tank 19 by the well known method.

After the coating 14 has been applied, the roll is placed in a second mold comprising mold plates 20 and 21. This mold is closed about the article and the mold is subjected to heat and pressure in an ordinary vulcanizing press. The heat causes the gases contained in the cells of the rubber cushion to expand, placing the coating 14 under compression. When vulcanization of the cover 14 is completed the roll is removed from the mold and is ready for use.

I claim:

1. The method of making a rubber covered roll having a smooth impervious face layer and an underlying cushion of uniform resiliency which comprises separately molding and vulcanizing a plurality of cushion sections of sponge rubber, assembling the sections about a shaft element, applying a cover of soft rubber composition about the sections, and mold vulcanizing the cover to provide a uniformly smooth surface layer of impervious material.

2. The method of making a rubber covered roll having a smooth impervious face layer and an underlying cushion of uniform resiliency which comprises separately molding and vulcanizing a plurality of cushion sections of sponge rubber, assembling the sections and adhering them upon a shaft element, forming a layer of dense rubber about the cushion sections by deposit from a liquid dispersion of rubber composition, and mold vulcanizing the cover to provide a uniformly smooth layer of impervious material.

3. A rubber covered roll comprising a rigid shaft, a cushion layer of uniform resiliency thereabout and comprising a body of sponge rubber having the characteristics of an independently molded sponge rubber article, and a relatively thin impervious cover layer of dense vulcanized rubber material of uniform thickness extending about said cushion without seams and having the characteristics of rubber deposited from a liquid dispersion of rubber composition, said cushion being cemented to said shaft and intimately bonded to said cover layer, and said roll having a smooth impervious surface concentric with said shaft.

4. A rubber covered roll comprising a rigid shaft, a cushion layer of uniform resiliency thereabout and comprising a plurality of segments of sponge rubber assembled about the shaft and cemented to each other, each segment having the characteristics of an independently molded sponge rubber article, and a relatively thin impervious cover layer of dense vulcanized rubber material of uniform thickness extending about said cushion without seams and having the characteristics of rubber deposited from a liquid dispersion of rubber composition, said cushion being cemented to said shaft and intimately bonded to said cover layer, and said roll having a smooth surface concentric with said shaft.

HOWARD M. DODGE.